(12) United States Patent
Venderbosch et al.

(10) Patent No.: US 11,952,488 B2
(45) Date of Patent: Apr. 9, 2024

(54) COMPOSITION COMPRISING POLYESTER AND POLYOLEFIN

(71) Applicant: SABIC GLOBAL TECHNOLOGIES B.V., Bergen op Zoom (NL)

(72) Inventors: Robert Walter Venderbosch, Bergen op Zoom (NL); Sjoerd Van Nispen, Geleen (NL); Johannes Peter Antonius Martens, Geleen (NL); Rob Boonman, Oosterhout (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 758 days.

(21) Appl. No.: 16/977,838

(22) PCT Filed: Mar. 26, 2019

(86) PCT No.: PCT/EP2019/057494
§ 371 (c)(1),
(2) Date: Sep. 3, 2020

(87) PCT Pub. No.: WO2019/185575
PCT Pub. Date: Oct. 3, 2019

(65) Prior Publication Data
US 2021/0024743 A1 Jan. 28, 2021

(30) Foreign Application Priority Data
Mar. 26, 2018 (EP) .................... 18163833

(51) Int. Cl.
*C08L 67/02* (2006.01)
(52) U.S. Cl.
CPC ........... *C08L 67/02* (2013.01); *C08L 2205/03* (2013.01); *C08L 2207/04* (2013.01); *C08L 2207/062* (2013.01); *C08L 2207/066* (2013.01); *C08L 2207/20* (2013.01)
(58) Field of Classification Search
CPC .. C08L 67/02; C08L 2207/20; C08L 2205/03; C08L 2207/066; C08L 2207/062; C08L 2207/04
See application file for complete search history.

(56) References Cited

U.S. PATENT DOCUMENTS

| | | |
|---|---|---|
| 3,994,417 A | 11/1976 | Boedecker |
| 5,017,714 A | 5/1991 | Welborn, Jr. |
| 5,324,820 A | 6/1994 | Baxter |
| 9,527,624 B1 | 12/2016 | Phipps et al. |
| 2006/0287441 A1 | 12/2006 | Miyama et al. |
| 2008/0135572 A1 | 6/2008 | Brennan et al. |
| 2013/0210949 A1 | 8/2013 | Scholl et al. |
| 2013/0210983 A1* | 8/2013 | Topolkaraev ........... C08L 63/00 524/502 |

FOREIGN PATENT DOCUMENTS

FR 2961213 A1 12/2011

OTHER PUBLICATIONS

International Search Report for International Application No. PCT/EP2019/057494, International Filng Date Mar. 26, 2019, dated Apr. 26, 2019, 6 pages.
Peacock, Andrew J., "Handbook of Polyethylene", Chapter 3 Production Processes, 2000, Marcel Dekker, Inc., New York; ISBN 0824795466; p. 43-66.
Written Opinion for International Application No. PCT/EP2019/057494, International Filng Date Mar. 26, 2019, dated Apr. 26, 2019, 5 pages.

* cited by examiner

*Primary Examiner* — Robert D Harlan
(74) *Attorney, Agent, or Firm* — CANTOR COLBURN LLP

(57) ABSTRACT

The invention relates to an article comprising a stud for fitting into a complementary receptacle and/or comprising a receptacle for fitting into a complementary stud comprising a composition comprising A) a polyester, B) a polyolefin and C) a compatibilizer, wherein the amount of A) is at least 75 wt % of the total composition, the amount of B) is 5 to 22.5 wt % of the total composition and the weight ratio of the amount of B) with respect to the amount of C) is 2 to 20. The invention further relates to an article comprising the composition, particularly a toy block.

15 Claims, No Drawings

COMPOSITION COMPRISING POLYESTER AND POLYOLEFIN

CROSS REFERENCE TO RELATED APPLICATIONS

This application is a National Stage application of PCT/EP2019/057494, filed Mar. 26, 2019, which claims the benefit of European Application No. 18163833.9, filed Mar. 26, 2018, both of which are incorporated by reference in their entirety herein.

The present invention relates to a composition comprising a polyester and a polyolefin. The invention further relates to a process for making such composition, an article comprising such composition and use of such composition for making an article, especially a toy block.

The most common material for making articles that—when combined—fit together, for example toy blocks such as LEGO® blocks is polycarbonate (PC) or acrylonitrile butadiene styrene (ABS). PC and ABS consist of components such as bisphenol A (BPA), acrylonitrile (AN), styrene (S) and butadiene (BD), for which alternative solutions are sought for environmental reasons and because they are under debate as they are associated with health risks.

Toy blocks made of PC/ABS have a combination of good mechanical properties such as low shrinkage, high impact strength and high tensile modulus. A high glossiness is also an important property for toy blocks.

It is an object of the invention to provide a composition which has a good balance of properties suitable for toy blocks. It is particularly desirable that the composition has properties comparable to PC or ABS.

It is another object of the invention to provide a composition that is suitable for replacing currently used materials in articles that—when combined—interlock.

Accordingly, the invention provides a composition comprising A) a polyester, B) a polyolefin and C) a compatibilizer, wherein the amount of A) is at least 75 wt % of the total composition, the amount of B) is 5 to 22.5 wt % of the total composition and the weight ratio of the amount of B) with respect to the amount of C) is 2 to 20.

The invention also provides an article comprising a stud for fitting into a complementary receptacle and/or comprising a receptacle for fitting into a complementary stud, preferably a toy block, comprising a composition comprising A) a polyester, B) a polyolefin and C) a compatibilizer, wherein the amount of A) is at least 75 wt % of the total composition, the amount of B) is 5 to 22.5 wt % of the total composition and the weight ratio of the amount of B) with respect to the amount of C) is 2 to 20.

Preferably, the article comprises at least 95 wt % of the composition, for example at least 96 wt %, for example at least 97 wt %, for example at least 98 wt %, for example at least 99 wt % based on the total weight of the article, for example the article consists of the composition.

It was surprisingly found that the articles comprising the composition according to the invention have a combination of good mechanical properties such as low shrinkage, high impact strength and high tensile modulus. The composition according to the invention further has good processability and high glossiness.

This means that the composition of the invention may suitably be used in articles that—when combined—interlock, as the articles of the invention have good mechanical properties, such as modulus and impact strength. In addition, the composition of the invention mimics the shrinkage properties of PC and ABS, so that the same hardware, such as dies and moulds can be used for preparing articles from the material of the invention as for PC and ABS.

It is noted that US2006287441 discloses a method for manufacturing a resin composition from a raw material composition containing a polyester resin, a polyolefin resin and a compatibilizer. The process comprises a kneading step for kneading the raw material composition in the presence of moisture.

It is further noted that FR2961213 discloses a composition comprising polyolefin, a polyester and a compatibilizer. The examples relate to compositions wherein the polyolefin is the major component of the composition.

US2013/0210949A1 discloses a thermoplastic composition comprising at least one rigid renewable polyester having a glass transition temperature of about 0° C. or more and at least one polymeric toughening additive, wherein the thermoplastic composition has a morphology in which a plurality of discrete primary domains and voids are dispersed within a continuous phase, the domains containing the polymeric toughening additive and the continuous phase containing the renewable polyester, wherein the thermoplastic composition has a density of about 1.4 grams per cubic centimeter or less, and wherein the average percent volume of the composition that is occupied by the voids is from about 20% to about 80% per cubic centimeter.

US2013/0210983A1 discloses a melt blended, thermoplastic composition comprising: at least one rigid renewable polyester having a glass transition temperature of about 0° C. or more; from about about 1 wt. % to about 30 wt. % of at least one polymeric toughening additive based on the weight of the renewable polyester; from about 0.1 wt. % to about 20 wt. % of at least one interphase modifier based on the weight of the renewable polyester; and wherein the thermoplastic composition has a morphology in which a plurality of discrete primary domains are dispersed within a continuous phase, the domains containing the polymeric toughening additive and the continuous phase containing the renewable polyester, further wherein the composition exhibits an izod impact strength of about 0.3 Joules per centimeter or more, measured at 23° C. according to ASTM D256-10 (Method A), and a tensile elongation at break of about 10% or more, measured at 23° C. according to ASTM D638-10, and wherein the ratio of the glass transition temperature of the thermoplastic composition to the glass transition temperature of the renewable polyester is from about 0.7 to about 1.3.

A) polyester

Typically polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (VIII)

(VIII)

wherein, R' is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic dicarboxylic acid. In one embodiment of the present invention the polyester could be an aliphatic polyester where at least one of R' or R is a cycloalkyl containing radical. The polyester is a condensation product where R' is the residue of an aryl, alkane or cycloalkane containing diol having 6 to 20 carbon atoms or chemical equivalent thereof, and R is the decarboxylated residue derived from an aryl, aliphatic or cycloalkane containing diacid of 6 to 20 carbon atoms or chemical equivalent thereof. The polyester resins are typically obtained through the condensation or ester interchange polymerization of the diol or diol equivalent component with the diacid or diacid chemical equivalent component.

R' and R are preferably cycloalkyl radicals independently selected from the following structure IX:

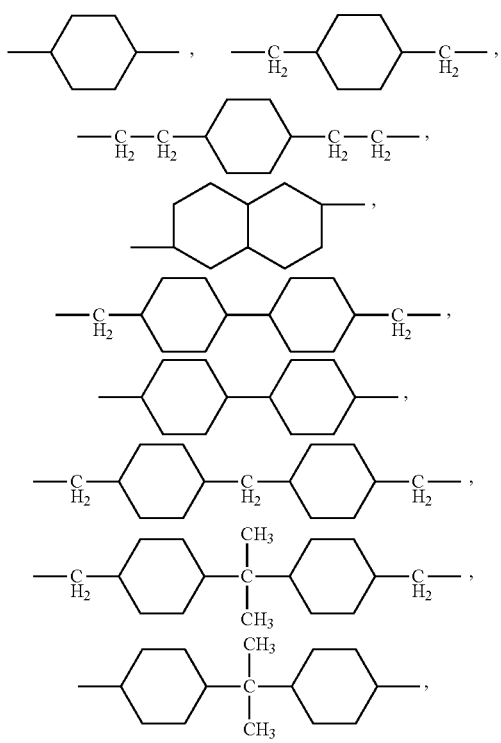

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters, and the like. Typically the polyester resin may comprise one or more resins selected from linear polyester resins, branched polyester resins and copolymeric polyester resins.

A preferred cycloaliphatic polyester is poly (cyclohexane-1,4-dimethylene cyclohexane-1,4-dicarboxylate) also referred to as poly (1,4-cyclohexane-dimethanol 1,4-dicarboxylate) (PCCD) which has recurring units of formula X:

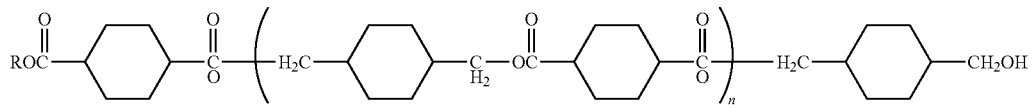

(X)

-continued

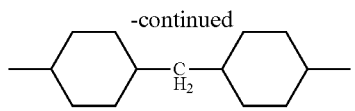

Preferably, the polyester is derived from structural units comprising at least one substituted or unsubstituted aliphatic diols, and/or substituted or unsubstituted cycloaliphatic diol and at least one substituted or unsubstituted aromatic dicarboxylic acid or substituted or unsubstituted aliphatic dicarboxylic acid.

Preferably, the polyester is at least one selected form a group consisting of poly(alkylene phthalate)s, poly(cycloalkylene phthalate)s, poly(alkylene dicarboxylate)s, esteramide copolymers, copolyesters derived from structural units comprising at least one alkyl diol, or cycloaliphatic diol, and at least one aromatic acid, aliphatic acids and cycloaliphatic acids.

Particularly preferably, the polyester comprises polyethylene terephthalate (PET), polybutylene terephthalate (PBT)

and/or polycyclohexylenedimethylene terephthalate. Preferably, the polyester comprises PET. Preferably, the polyester in the composition according to the invention consists of PET.

The polyester may be in the form of unused pellet products or recycled (processed) products in the form of flake, pellet or powder, which may be derived e.g. from PET bottles. Preferably, the polyester is a recycled polyester, in particular a recycled PET, for example derived from PET bottles. Preferably the polyester, in particular PET, is dried before being mixed with other components of the composition according to the invention.

The polyester may be bio-based, i.e. the polyester may be a polyester produced from materials or products derived from or made using biological raw materials. Such materials are renewable and are typically obtained from or produced by living organisms such as, for example, plants, trees, algae, bacteria, yeast, fungi, protozoa, insects, animals, and the like. Processes for obtaining diacids from such biomaterials are known to those of skill in the art. Biobased or bioderived difunctional acids are preferred because of a lower ecological footprint associated with production and use of such materials.

Preferably, the polyester, in particular PET, has an intrinsic viscosity (IV) of 0.1 to 1.0 dl/g, for example 0.5 to 0.9 dl/g, as determined by according to ASTM D4603.

Preferably, the polyester, in particular PET, has a melt volume index (MVI) of 5 to 100 dg/min, for example 10 to 50 dg/min, according to ISO 1133 (2.16 kg, 280° C.).

Preferably, the polyester, in particular PET, has a density of at most 1.35 g/cm$^3$ as determined according to ISO 1183. This indicates a lower crystallinity of the polyester, in particular PET, which leads to desirable properties of the final composition.

Preferably, the amount of the polyester is 75 to 94 wt %, preferably 80 to 94 wt % or 85 to 92 wt % with respect to the total composition.

B) polyolefin

Examples of the polyolefin include low density polyethylene (LDPE), linear low density polyethylene (LLDPE) and high density polyethylene (HDPE); polypropylene (PP) and an elastomeric copolymer of ethylene and an α-olefin having 4 to 10 carbon atoms.

Preferably, the amount of the polyolefin is 5 to 20 wt %, preferably 6 to 18 wt % or 8 to 15 wt % with respect to the total composition.

The polyolefin may have a density of 0.850 to 0.970 g/cm$^3$ determined according to ISO1183.

Preferably the total amount of the polyester and the polyolefin is 90 to 99 wt % with respect to the total composition.

LDPE, LLDPE and HDPE

The production processes of LDPE, LLDPE and HDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

LDPE

The LDPE may be an ethylene homopolymer or may comprise a comonomer, for example butene or hexene.

Preferably, the LDPE has a density of 0.916 to 0.940 g/cm$^3$, more preferably 0.920 to 0.930 g/cm$^3$, determined according to ISO1183.

Preferably, the LDPE has a Melt flow index of 0.1 to 10.0 g/10 min, more preferably 1.0 to 5.0 g/10 min, determined according to ASTM D1238 (190° C./2.16 kg).

The LDPE may be produced by use of autoclave high pressure technology or by tubular reactor technology.

In some embodiments, the polyolefin in in the composition according to the invention is an LDPE having a density of 0.916 to 0.940 g/cm$^3$ determined according to ISO1183 and a Melt flow index of 0.1 to 10.0 g/10 min determined according to ASTM D1238 (190° C./2.16 kg) and the amount of the LDPE in the composition is 5 to 15 wt %. Such composition was found to have a high gloss, a high MVR and a high tensile modulus while having acceptable impact strength and shrinkage.

LLDPE

The LLDPE may be an ethylene homopolymer or may be a polyethylene copolymer comprising ethylene and a C3-C10 alpha-olefin comonomer (ethylene-alpha olefin copolymer). Suitable alpha-olefin co monomers include 1-butene, 1-hexene, 4-methyl pentene and 1-octene. The preferred comonomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the density of the LLDPE may range between 0.915 g/cm$^3$ and 0.940 g/cm$^3$, preferably 0.930 to 0.940 g/cm$^3$, determined according to ISO1183.

Preferably, the melt flow index of the LLDPE ranges from 0.1 to 5.0 g/10 min, for example from 0.5 to 4.0 g/10 min, for example from 1.0 to 3.0 g/10 min, determined according to ASTM D1238 (190° C./2.16 kg).

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

In some embodiments, the polyolefin in in the composition according to the invention is an LLDPE having a density of 0.915 to 0.940 g/cm$^3$ determined according to ISO1183 and a Melt flow index of 0.1 to 5.0 g/10 min determined according to ASTM D1238 (190° C./2.16 kg) and the amount of the LLDPE in the composition is 5 to 15 wt %. Such composition was found to have a high MVR and a high tensile modulus while having acceptable gloss, impact strength and shrinkage.

HDPE

HDPE may be an ethylene homopolymer or may comprise a comonomer, for example butene or hexene.

Preferably, the HDPE has a density of 0.940 to 0.970 g/cm$^3$, more preferably 0.950 to 0.965 g/cm$^3$, determined according to ISO1183.

Preferably, the HDPE has a Melt flow index of 0.1 to 15.0 g/10 min, more preferably 1.0 to 10.0 g/10 min, measured according to ASTM D1238 (190° C./5 kg).

In some embodiments, the polyolefin in in the composition according to the invention is an HDPE having a density of 0.940 to 0.970 g/cm$^3$ determined according to ISO1183 and a Melt flow index of 0.1 to 15.0 g/10 min determined according to ASTM D1238 (190° C./2.16 kg) and the amount of the HDPE in the composition is 5 to 15 wt %. Such composition was found to have a high gloss, a high MVR, a high tensile modulus and a low shrinkage while having acceptable impact strength.

PP

With polypropylene as used herein is meant propylene homopolymer or a copolymer of propylene with an α-olefin, for example an α-olefin chosen from the group of α-olefin having 2 or 4 to 10 C-atoms, for example ethylene, for example wherein the amount of α-olefin is less than 10 wt % based on the total propylene copolymer.

Polypropylene can be made by any known polymerization technique as well as with any known polymerization catalyst system. Regarding the techniques, reference can be given to slurry, solution or gasphase polymerizations; regarding the catalyst system reference can be given to Ziegler-Natta, metallocene or single-site catalyst systems. All are, in themselves, known in the art.

Preferably, the tensile modulus of the PP ranges from 800 to 1800 MPa, determined according to ASTM D790A.

Preferably, the melt flow index of the PP as determined using ASTM D1238 (230° C./2.16 kg) ranges from 0.3 to 50 dg/min.

Elastomeric Copolymer

The polyolefin may be an elastomeric copolymer of ethylene and an α-olefin having 4 to 10 carbon atoms. The α-olefin comonomer in the elastomeric copolymer is preferably an acyclic monoolefin such as 1-butene, 1-pentene, 1-hexene, 1-octene or 4-methylpentene. Most preferably, the elastomeric copolymer is an ethylene-1-octene copolymer.

Preferably, the elastomeric copolymer has a density of 0.850 to 0.910 g/cm$^3$. Preferably, the density of the elastomeric copolymer is 0.865 to 0.910 g/cm$^3$, for example 0.865 to 0.875 g/cm$^3$ according to ASTM D792.

Preferably, the elastomeric copolymer has a melt flow index of 1.0 to 10.0 dg/min, for example 3.0 to 8.0 dg/min, measured in accordance with ASTM D1238 using a 2.16 kg weight and at a temperature of 190° C.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the amount of ethylene in the elastomer is at least 50 mol %. More preferably, the amount of ethylene in the elastomer is at least 57 mol %, for example at least 60 mol %, at least 65 mol % or at least 70 mol %. Even more preferably, the amount of ethylene in the elastomer is at least 75 mol %. The amount of ethylene in the elastomer may typically be at most 97.5 mol %, for example at most 95 mol % or at most 90 mol %.

In some embodiments, the polyolefin in in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 5 to 15 wt %. Such composition was found to have a high gloss, a high MVR, a high tensile modulus, a high impact strength and a low shrinkage.

In some embodiments, the polyolefin in in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 15 to 25 wt %. Such composition was found to have a high gloss, an extremely high impact strength and a low shrinkage while having acceptable MVR and tensile modulus.

C) Compatibilizer

Preferably, the compatibilizer comprises a copolymer of ethylene and a comonomer selected from the group consisting of an unsaturated carboxylic acid such as acrylic acid, methacrylic acid, maleic acid, fumaric acid and itaconic acid, and its anhydrate;

ester of unsaturated carboxylic acid such as methyl acrylate, methyl methacrylate, dimethyl maleate, monomethyl maleate, diethyl fumarate, dimethyl itaconate, diethyl citraconate and dimethyl tetrahydro phthalic acid;

glycidylester of unsaturated monocarboxylic acid such as glycidylacrylate, glycidylmethacrylate and glycidyl p-styryl carboxylate;

monoglycidylester or polyglycidylester of unsaturated polycarboxylic acid such as maleic acid, itaconic acid, citraconic acid and butenetricarboxylic acid; and unsaturated glycidylether such as allylglycidylether, 2-methylallylglycidylether and glycidylether of o-allylphenol.

The role of the compatibilizer is to decrease the interfacial tension between the immiscible blends of the polar polyester phase and the a-polar polyolefin phase. Addition of the compatibilizer improves adhesion between both phases and stabilizes the morphology of the polyester/polyolefin compound against coalescence resulting in improved mechanical properties compared to the polyester/polyolefin compound without compatibilizer.

Preferably, the weight ratio of the amount of B) with respect to the amount of C) is 2 to 10 or 3 to 6.

Preferably, the amount of C) in the composition is 0.1 to 15 wt %, for example 0.2 to 12 wt %, 0.3 to 10 wt %, 0.5 to 5 wt %. A lower amount of compatabilizer leads to a lower shrinkage and therefore the amount of C) in the composition is preferably 0.75 to 4 wt %, more preferably 1 to 3 wt %, even more preferably 1 to 2 wt %.

Preferably, the total amount of A), B) and C) is at least 95 wt %, at least 98 wt %, at least 99 wt %, at least 99.9 wt % or 100 wt %.

Particularly preferred compatibilizer is a copolymer of ethylene and glycidylmethacrylate, commercially available as Lotader AX8840.

D) Additives

The composition according to the invention may further comprise optional components different from the previously mentioned components of the composition, such as additives, wherein the total of the previously mentioned components and the optional components is 100 wt % of the total composition. Accordingly, the invention relates to a composition consisting of the previously mentioned components and the optional components.

The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The amount of the additives may e.g. be 0.1 to 5 wt %, for example 0.2 to 1 wt %, based on the total composition.

Properties of Composition

Preferably, the composition according to the invention has melt volume flow rate (MVR) of at least 5 cc/10 min, for example 5 to 20 cc/10 min or 20 to 40 cc/10 min, as determined by ISO1133 (2.16 kg, 265° C., 300 seconds).

Preferably, the composition according to the invention has melt volume flow rate (MVR) of at least 10 cc/10 min, for example 10 to 25 cc/10 min or 25 to 50 cc/10 min, as determined by ISO1133 (2.16 kg, 265° C., 900 seconds).

Preferably, the composition according to the invention has a shrinkage of at most 2%, more preferably at most 1.5%, more preferably at most 1.3%, more preferably at most 1.0%, as determined by ISO 294-4.

Preferably, the composition according to the invention has a notched impact strength of at least 5 kJ/m2, more preferably at least 10 kJ/m2, more preferably at least 20 kJ/m2 or more preferably at least 30 kJ/m2, as determined by ISO180 (23° C.) and Preferably, the composition according to the invention has a tensile modulus of at least 1500 MPa, more preferably at least 1600 MPa, more preferably at least 1800 MPa as determined by ISO527.

Preferably, the composition according to the invention has a gloss of at least 50 gloss units, more preferably at least 75 gloss units, more preferably at least 90 gloss units, as determined by ISO2813 at a measurement angle of 60°.

Preferably, the composition according to the invention has at least one, preferably two, most preferably all, of a shrinkage of at most 2%, more preferably at most 1.5%, more preferably at most 1.3%, more preferably at most 1.0%, as determined by ISO 294-4, a notched impact strength of at least 5 kJ/m2, more preferably at least 10 kJ/m2, more preferably at least 20 kJ/m2 or more preferably at least 30 kJ/m2, as determined by ISO180 (23° C.) and a tensile modulus of at least 1500 MPa, more preferably at least 1600 MPa, more preferably at least 1800 MPa as determined by ISO527. In addition, the composition preferably has a gloss of at least 50 gloss units, more preferably at least 75 gloss units, more preferably at least 90 gloss units, as determined by ISO2813 at a measurement angle of 60°.

Other Aspects

The composition of the invention may be obtained by a process comprising melt-mixing A), B) and C) and optionally the optional components by using any suitable means. Accordingly, the invention further relates to a process for the preparation of the composition according to the invention comprising melt mixing A), B) and C) and optional components. Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives.

Suitable conditions for melt-mixing, such as temperature, pressure, amount of shear, screw speed and screw design when an extruder is used are known to the skilled person.

The Article

In one embodiment, the article of the invention comprising a stud can suitably be used to interlock with another article of the invention comprising a receptacle for receiving the stud. For example, the stud of one article of the invention may be designed such that it can be removably attached to the protuberance of another article of the invention. For example, the stud and the protuberance may be designed for interlocking the articles, for example the stud and protuberance may be designed to form fit.

For purpose of the invention with stud is meant a protuberance projecting from a surface or a part.

The article of the invention is for example a building block, a toy block, a hinge or a gear wheel.

In a special embodiment, the article of the invention comprises a stud for fitting into a complementary receptacle and comprises a receptacle which is complementary to the stud. Examples of such articles are toy blocks, wherein the stud(s) from the top of one block fit(s) into the receptacle(s) on the bottom of the next block and the stud(s) from the next block fit into the receptacle(s) on the bottom of another block, etc.

The invention therefore also relates to an assembly of at least two articles of the invention, wherein at least one of the at least two articles comprises a stud and another of the at least two articles comprises a receptacle for receiving the stud.

The invention further relates to an article comprising the composition according to the invention. Preferably, the article is an injection molded article.

Preferably, the article is a toy block.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Experiments

Following Materials were Used.

PET: copolymer of terephtalic acid, isophtalic acid and diethylene glycol, intrinsic viscosity of 0.800 dl/g as determined by according to ASTM D4603 and MVI of 20 dg/min (2.16 kg, 280° C.) according to ISO 1133 (SABIC® PET BC-112 as commercially available from SABIC)

HDPE: copolymer of ethylene and butene, MFI of 8 dg/min according to ASTM D1238 (2.16 kg, 190° C.), density of 0.964 g/cm$^3$ according to ISO 1183

LLDPE: copolymer of ethylene and hexene, MFI of 2.8 dg/min according to ASTM D1238 (2.16 kg, 190° C.), density of 0.935 g/cm$^3$ according to ISO 1183

LDPE: homopolymer of ethylene, MFI of 4.2 dg/min according to ASTM D1238 (2.16 kg, 190° C.), density of 0.925 g/cm$^3$ according to ISO 1183

POE: copolymer of ethylene and 1-octene, MFI of 5 dg/min according to ASTM D1238 (2.16 kg, 190° C.), density of 0.87 g/cm$^3$ according to ASTM D792

Compatibilizer: commercial name LOTADER AX 8840; copolymer of ethylene and glycidylmethacrylate, MFI of 5 dg/min according to ASTM D1238 (2.16 kg, 190° C.), density of 0.964 g/cm$^3$ according to ASTM 1183

Blends of were prepared by melt-mixing in a twin-screw extruder from components as shown in Tables 1-4. The following properties were measured and summarized in Tables 1-4.

Gloss: ISO 2813 at a measurement angle of 60°

MVR: ISO1133 (2.16 kg and 265° C.), 300 seconds and 900 seconds

Notched impact strength: ISO180, 23° C.

Tensile modulus: ISO527

Shrinkage: ISO 294-4

Heat Deflection Temperature: ISO75

Vicat temperature: ISO306

TABLE 1

| | | PE = LLDPE | | | | |
|---|---|---|---|---|---|---|
| | | CE1 | CE2 | E3 | E4 | CE5 |
| PET | % | 100.0 | 98.9 | 90 | 80 | 70.0 |
| LLDPE | % | | | 8.9 | 17.8 | 26.7 |
| compatibilizer | % | | 1.1 | 1.1 | 2.2 | 3.3 |
| IRGANOX 1010 | | 0.25 | 0.25 | 0.3 | 0.3 | 0.25 |
| IRGAFOS 168 | | 0.25 | 0.25 | 0.25 | 0.25 | 0.25 |
| Gloss/60° | | — | 102 | 58 | 16 | 89 |
| MVR 265° C./2.16 KG/300 sec | cc/10' | 39.7 | 33.8 | 32.4 | 12.4 | 0.2 |
| MVR 265° C./2.16 KG/900 sec | cc/10' | 36.7 | 32.2 | 47.6 | 19 | 0.2 |
| Notched Impact Strength 23° C. | kJ/m$^2$ | 3 | 3 | 6 | 9 | 9 |
| Tensile Modulus | MPa | 2663 | 2555 | 2280 | 1843 | 1474 |
| Shrinkage T-bar | % | 1.1 | 1.1 | 0.7 | 1.5 | 1.7 |

TABLE 1-continued

| | | PE = LLDPE | | | | |
|---|---|---|---|---|---|---|
| | | CE1 | CE2 | E3 | E4 | CE5 |
| HDT 1.8 MPa | ° C. | 69 | 68 | 68 | 66 | 63 |
| VICAT B120 | ° C. | 114 | 112 | 110 | 97 | 78 |

The amounts of Irganox 1010 and Irgafos 168 are wt part per 100 wt part of the total of PET, polyolefin and compatibilizer.

From Table 1, it can be understood that the compositions according to the invention have a good combination of mechanical properties such as shrinkage, impact strength and tensile modulus. The compositions according to the invention further have good processability and acceptable glossiness. In the comparative experiments wherein the amount of the LLDPE is outside the claimed range, the impact strength or the tensile modulus is too low.

TABLE 2

| | | PE = POE | | | | |
|---|---|---|---|---|---|---|
| | | CE1 | CE2 | E6 | E7 | CE8 |
| PET_HIGH_IV-100 | % | 100.0 | 98.9 | 90 | 80 | 70.0 |
| POE | % | | | 8.9 | 17.8 | 26.7 |
| compatibilizer | % | | 1.1 | 1.1 | 2.2 | 3.3 |
| IRGANOX 1010 | | 0.25 | 0.25 | 0.3 | 0.3 | 0.25 |
| IRGAFOS 168 | | 0.25 | 0.25 | 0.25 | 0.25 | 0.25 |
| Gloss/60° | | — | 102 | 103 | 101 | — |
| MVR 265 C./2.16 KG/300 sec | cc/10' | 39.7 | 33.8 | 32.9 | 8 | |
| MVR 265 C./2.16 KG/900 sec | cc/10' | 36.7 | 32.2 | 46.7 | 11.5 | — |
| Notched Impact Strength 23° C. | kJ/m$^2$ | 3 | 3 | 9 | 55 | |
| Tensile Modulus | MPa | 2663 | 2555 | 1962 | 1556 | — |
| Shrinkage T-bar | % | 1.1 | 1.1 | 0.8 | 0.6 | — |
| HDT 1.8 MPa | ° C. | 69 | 68 | 65 | 64 | — |
| VICAT B120 | ° C. | 114 | 112 | 75 | 74 | — |

The amounts of Irganox 1010 and Irgafos 168 are wt part per 100 wt part of the total of PET, polyolefin and compatibilizer.

The composition of CE8 could not be produced since the material was too soft to be cut into granules. Also from Table 2, it can be understood that the compositions according to the invention have a good combination of mechanical properties such as shrinkage, impact strength and tensile modulus. The compositions according to the invention further have good processability and high glossiness. The comparative experiments wherein the amount of the LLDPE is outside the claimed range have a very low impact strength or they cannot be processed.

TABLE 3

| | | PE = LLDPE | | | |
|---|---|---|---|---|---|
| | | E3 | E9 | E4 | E10 |
| PET | % | 90 | 90 | 80 | 80 |
| LLDPE | % | 8.9 | 8 | 17.8 | 16 |
| compatibilizer | % | 1.1 | 2 | 2.2 | 4 |
| IRGANOX 1010 | | 0.3 | 0.3 | 0.3 | 0.3 |
| IRGAFOS 168 | | 0.25 | 0.25 | 0.25 | 0.25 |

TABLE 3-continued

PE = LLDPE

|  |  | E3 | E9 | E4 | E10 |
|---|---|---|---|---|---|
| Gloss/60° |  | 58 | 99 | 16 | 42 |
| MVR 265 C/ 2.16 KG/ 300 sec | cc/10' | 32.4 | 30.1 | 12.4 | 7.6 |
| MVR 265 C/ 2.16 KG/ 900 sec | cc/10' | 47.6 | 46.2 | 19 | 10.7 |
| Notched Impact Strength 23° C. | kJ/m² | 6 | 6 | 9 | 10 |
| Tensile Modulus | MPa | 2280 | 2183 | 1843 | 1803 |
| Shrinkage T-bar | % | 0.7 | 1.2 | 1.5 | 1.9 |
| HDT 1.8 MPa | ° C. | 68 | 66 | 66 | 66 |
| VICAT B120 | ° C. | 110 | 104 | 97 | 96 |

The amounts of Irganox 010 and Irgafos 68 are wt part per 100 wt part of the total of PET, polyolefin and compatibilizer.

Table 3 shows the effect of the amount of the compatibilizer. A lower amount of the compatibilizer leads to a lower shrinkage and a higher MVR.

TABLE 4 various PE

|  |  | E11 | E4 | E12 | E7 |
|---|---|---|---|---|---|
| PET | % | 80 | 80 | 80 | 80 |
| HDPE | % | 17.8 |  |  |  |
| LLDPE | % |  | 17.8 |  |  |
| LDPE | % |  |  | 17.8 |  |
| POE | % |  |  |  | 17.8 |
| compatibilizer | % | 2.2 | 2.2 | 2.2 | 2.2 |
| IRGANOX 1010 |  | 0.3 | 0.3 | 0.3 | 0.3 |
| IRGAFOS 168 |  | 0.25 | 0.25 | 0.25 | 0.25 |
| Gloss/60° |  | 36 | 16 | 84 | 101 |
| MVR 265 C/ 2.16 KG/ 300 sec | cc/10' | 11.8 | 12.4 | 6.5 | 8 |
| MVR 265 C/ 2.16 KG/ 900 sec | cc/10' | 12.1 | 19 | 10.8 | 11.5 |
| Notched Impact Strength 23° C. | kJ/m² | 6 | 9 | 5 | 55 |
| Tensile Modulus | MPa | 2008 | 1843 | 1681 | 1556 |
| Shrinkage T-bar | % | 2.1 | 1.5 | 0.8 | 0.6 |
| HDT 1.8 MPa | ° C. | 67 | 66 | 64 | 64 |
| VICAT B120 | ° C. | 103 | 97 | 73 | 74 |

The amounts of Irganox 1010 and Irgafos 68 are wt part per 100 wt part of the total of PET, polyolefin and compatibilizer.

Table 4 shows the effect of the type of the PE. It can be generally understood that the lower density of the PE (HDPE>LLDPE>LDPE>POE) leads to a lower modulus and a low shrinkage. The compositions with LDPE or POE as PE have a very high gloss and a very low shrinkage. In particular, the composition with POE as PE has an extremely high impact strength. Preferably therefore, the articles comprise a composition comprising as component B) LDPE or POE, more preferably POE As can be seen from Tables 1, 2, 3 and 4, the impact of the articles of the invention is increased as compared to the comparative examples and the tensile modulus is sufficiently maintained. In addition, the shrinkage ('shrinkage T-bar') of the articles is in a similar range as PC and ABS (in the range from 0.5 to 2.0%).

The invention claimed is:

1. An article comprising a stud for fitting into a complementary receptacle and/or comprising a receptacle for fitting into a complementary stud comprising a composition comprising A) a polyester, B) a polyolefin and C) a compatibilizer, wherein
   the amount of A) is at least 75 wt % of the total composition,
   the amount of B) is 5 to 22.5 wt % of the total composition and
   the weight ratio of the amount of B) with respect to the amount of C) is 2 to 20,
      wherein A) is polyethylene terephthalate having a density of at most 1.35 g/cm³ as determined according to ISO 1183, and
      B) is selected from the group consisting of
         a low density polyethylene having a density of 0.916 to 0.940 g/cm³ according to ISO1183 and a melt flow index of 0.1 to 10.0 g/10 min, measured in accordance with ASTM D1238 using a 2.16 kg weight and at a temperature of 190° C.,
         a linear low density polyethylene having a density of 0.915 to 0.940 g/cm³ according to ISO 1183 and a melt flow index of 0.1 to 5 g/10 min, measured in accordance with ASTM D1238 using a 2.16 kg weight and at a temperature of 190° C.,
         a high density polyethylene having a density of 0.940 to 0.970 g/cm³ according to ISO1183 and a melt flow index of 0.1 to 15 g/10 min, measured in accordance with ASTM D1238 using a 2.16 kg weight and at a temperature of 190° C., and
         an elastomeric copolymer of ethylene and an α-olefin having 4 to 10 carbon atoms having a melt flow index of 3.0 to 8.0 g/10 min, measured in accordance with ASTM D1238 using a 2.16 kg weight and at a temperature of 190° C.

2. The article according to claimed 1, wherein A) is a recycled PET.

3. The article according to claim 1, wherein the amount of B) is 8 to 15 wt % with respect to the total composition.

4. The article according to claim 1, wherein C) comprises a copolymer of ethylene and a comonomer selected from the group consisting of an unsaturated carboxylic acid; an anhydrate of the unsaturated carboxylic acid; an ester of the unsaturated carboxylic acid; a glycidylester of an unsaturated monocarboxylic acid; a monoglycidylester or polyglycidylester of an unsaturated polycarboxylic acid; and an unsaturated glycidylether.

5. The article according to claim 1, wherein the amount of C) is 0.5 to 5 wt %.

6. The article according to claim 1, wherein the weight ratio of the amount of B) with respect to the amount of C) is 2 to 10.

7. The article according to claim 1, wherein the composition has at least one of a shrinkage of at most 2% as determined by ISO 294-4, a notched impact strength of at least 5 kJ/m² as determined by ISO180 (23° C.) and a tensile modulus of at least 1500 MPa.

8. The article according to claim 1, wherein the article is an injection molded article.

9. The article according to claim 1, wherein the article is a building block, a toy block, a hinge or a gear wheel.

10. The article according to claim 1, wherein the article comprises a stud for fitting into a complementary receptacle and the article comprises a receptacle which is complementary to the stud.

11. The article according to claim 1, wherein C) comprises a copolymer of ethylene and glycidylmethacrylate.

12. The article according to claim 1, wherein the weight ratio of the amount of B) with respect to the amount of C) is 3 to 6.

13. The article according to claim 1, wherein B) is selected from the group consisting of
  the linear low density polyethylene;
  the linear low density polyethylene; and
  the high density polyethylene.

14. The article according to claim 1, wherein
  the low density polyethylene has a melt flow index of 1 to 5 g/10 min, measured in accordance with ASTM D1238 using a 2.16 kg weight and at a temperature of 190° C.;
  the linear low density polyethylene has a density of 0.930 to 0.940 g/cm$^3$ according to ISO 1183 and a melt flow index of 1.0 to 3.0 g/10 min, measured in accordance with ASTM D1238 using a 2.16 kg weight and at a temperature of 190° C., and
  a high density polyethylene has a density of 0.950 to 0.965 g/cm$^3$ according to ISO1183 and a melt flow index of 1.0 to 10.0 g/10 min, measured in accordance with ASTM D1238 using a 2.16 kg weight and at a temperature of 190° C.

15. The article according to claim 1, wherein the article is a toy block.

\* \* \* \* \*